United States Patent [19]

Chung et al.

[11] Patent Number: 4,609,470

[45] Date of Patent: Sep. 2, 1986

[54] METHOD OF BIOPOLYMERIC SLUDGE DEWATERING

[75] Inventors: Koo-Heung Chung, Granger; Gary L. Davis, Argos; Francis H. Verhoff, Goshen, all of Ind.

[73] Assignee: Miles Laboratories, Inc., Elkhart, Ind.

[21] Appl. No.: 752,824

[22] Filed: Jul. 8, 1985

[51] Int. Cl.$^4$ .............................................. C02F 11/14
[52] U.S. Cl. ........................... 210/725; 210/727; 210/730
[58] Field of Search .................. 210/609, 724–730

[56] References Cited

U.S. PATENT DOCUMENTS 1,892,972  1/1933  Urbain ................................. 210/725
3,533,940  10/1970  Peniston et al. ................. 210/730 X
4,382,864  5/1983  Hashimoto et al. ................. 210/727

OTHER PUBLICATIONS

V. J. McGahren et al., Process Biochem., 19, 88 (1984).
D. Knorr, Food Technology (Jan., 1984), pp. 85–97.
R. C. Baskerville et al., The Journal of the Institute of Water Pollution, 2, 3 (1968).

*Primary Examiner*—Thomas Wyse
*Attorney, Agent, or Firm*—Jerome L. Jeffers

[57] ABSTRACT

An improved method for dewatering aqueous sludge is disclosed comprising flocculating the sludge by the addition of effective amounts of chitosan and an organic dialdehyde such as glutaraldehyde to the sludge, which is also preferably acidified to about pH 6.0.

12 Claims, No Drawings

METHOD OF BIOPOLYMERIC SLUDGE DEWATERING

BACKGROUND OF THE INVENTION

Municipal and industrial waste water treatment includes an activated sludge treatement process and can include a further anaerobic sludge treatment process depending upon the target conditions with respect to the quality and quantity of the waste water effluents from the waste treatment plant. One of the main goals of these processes is the reduction of aqueous sewage sludge volume. Thus, the cost of dewatering anaerobically digested sludges that contain high volumes of water is becoming the critical economic factor in the overall waste treatment operation.

The dewatering of sewage sludges is one of the most difficult processes to accomplish in sewage treatments. The main reason is that sludges have varying chemical and physical characteristics resulting from the many kinds of organisms which can be present, continuous changes of influent composition, and the variability between treatment plant equipment. For the purpose of sludge dewatering, the anionic nature of digested sludge has been employed to flocculate the sludge with cationic chemical polyelectrolytes. The solid floc formed in this way is then separated from the liquid phase by mechanical dewatering devices, including vacuum filters, centrifugal dehydrators, belt presses, filter presses, and screw presses. Centrifugation is used quite frequently by large municipal waste treatment plants, because it can handle large volumes of sludge on a continuous basis. Thus, many attempts have been made to improve the efficiency of dewatering via centrifugation. A major problem associated with centrifugal separation is that the initial floc strength is reduced as the floc is subjected to shear stresses in the pumps and centrifuges. This floc deformation results in a low yield of sludge solids capture and a high level of resuspended materials in the centrate.

Chitosan, a polyanionic carbohydrate polymer, has been found to be effective for coagulating protein from food product wastes such as brewery and vegetable activated sludge, and its use as a flocculating agent for the treatment of waste water has been reported in Japan. See V. J. McGahren et al, Process Biochem., 19, 88 (1984). However, its use for the dewatering of sewage sludge has not found wide acceptance, possibly due to the relatively low strength of the resultant floc. Thus, a substantial need exists for an improved method to dewater aqueous sludge. A further need exists for a method to treat digested or undigested sewage sludge which yields a floc of high strength which settles and releases water rapidly.

BRIEF DESCRIPTION OF THE INVENTION

The present invention provides a method for dewatering aqueous sludge such as sewage sludge, which comprises mixing the sludge with an amount of chitosan effective to flocculate the sludge solids and an amount of an organic dialdehyde effective to substantially strengthen the solid floc and to increase its settling rate. A high degree of solids separation is achieved when sewage sludge is mechanically dewatered following this treatment. The physical properties of the floc can also be improved by adding the dialdehyde to the sludge prior to the addition of the chitosan and by adjusting the pH of the sludge to about 5-7 during the flocculation step. The present method provides floc which is substantially stronger in terms of its resistance to resuspension following the application of high shear forces and which separates more readily from the liquid phase than floc obtained by the use of chitosan alone at a natural pH or by the use of a synthetic cationic polymeric flocculant, as determined by standard tests.

DETAILED DESCRIPTION OF THE INVENTION

The method of the present invention rapidly yields a floc which is sufficiently strong so that substantially all of the suspended organic materials in the aqueous sludge can be agglomerated and dewatered by centrifugation or vacuum filtration, without substantial resuspension of the floc solids. Although, as noted hereinabove, the composition of the sludge can vary, depending on the source of the sludge and the pretreatment steps, the present method is particularly well adapted to dewater digested or undigested sewage sludges comprising more than 80%, preferably more than 90% and most prefereably more than 95% water, e.g. from about 95-98.5% water. The solids which remain suspended in the aqueous phase after pre-treatment of the sewage sludge, and which are captured in the flocculation step, are primarily organic solids such as bacteria and bacterial residues, cellulosic and proteinaceous material and the like.

Chitosan

The chitosan employed in the present dewatering method is a commercially-available material which can be prepared by the deacetylation of chitin by treatment of the chitin with hot concentrated aqueous sodium hydroxide (40-50%). Chitin [poly-beta-(1,4)-N-acetyl-D-glucosamine] is a mucopolysaccharide which is derived from marine invertebrates, insects, fungi and yeast. Chitosan is soluble in dilute aqueous acid and can act as a cationic polyelectrolyte. For a review of the properties and applications of chitin and chitosan, see D. Knorr, in Food Technology (Jan., 1984) at pages 85–97, the disclosure of which is incorporated by reference herein.

Chitosan of shell fish origin, e.g. crab, shrimp and the like, or from mycelium is preferred for use in the present invention, and is commercially available from Pfaltz & Bauer, Stanford, Conn., from Protah, Redmond Wash. and from Madera Products, Inc., Albany, Oreg. Preferably chitosan will be added to the aqueous sludge to the extent of about 0.5-5%, most preferably about 1-3%, by weight of the total (dry) sludge solids. Although solid chitosan will dissolve in acidic or acidified liquid sludge, it is normally preferable to add the chitosan to the sludge in the form of a dilute, acidic aqueous solution.

Organic Dialdehyde

In addition to the use of an effective flocculating amount of chitosan, the present method comprises the addition to the sludge of an amount of an organic dialdehyde effective to substantially strengthen the floc and to increase its settling (sedimentation) rate. A wide variety of organic dialdehydes can be employed in the present method, such as those of the general formula I: OHCXCHO wherein X is a single bond (OHC—CHO, glyoxal) or is an alkylene group of about 1-5 carbon atoms. Aqueous formaldehyde can also be employed in the present method, and due to its tendency to oligomerize or polymerize, can be considered a dialdehyde within the context of the present invention. Compounds which are converted to dialdehydes in aqueous acid are also included within the scope of the term "dialdehyde." Such compounds include the (lower) alkyl acetals and hemiacetals of the compounds of formula I such as malonaldehyde (diethyl)acetal. Preferred compounds of formula I include glyoxal and glutaraldehyde. The organic dialdehyde is preferably mixed with the aqueous sludge to the extent of about 0.05–0.5%, preferably about 0.075–0.25% by weight of the total (dry) sludge solids.

It was unexpectedly discovered that superior floc strength and sedimentation rates were achieved when the addition of the glutaldehyde or other aldehyde preceded the addition of the chitosan to the aqueous sludge. This is contrary to the order of addition required in many other systems in which glutaraldehyde and chitosan/chitin have been employed, such as en enzyme immobilization methods.

pH Adjustment

It is also preferable to adjust the final pH of the sludge-chitosan-glutaraldehyde mixture to a slightly acidic value, if necessary, e.g. to about 5–7, most preferably to about 5.5–6.5. Due to the neutral or alkaline nature of most types of digested sewage sludge, the pH adjustment can readily be accomplished by the addition of an acid such as a weak organic acid, e.g. acetic acid, citric acid, gluconic acid, tartaric acid and the like.

Although not intending to the bound by any theory of operation or reaction mechanism, it is believed that the floc which is formed by the reaction between the cationic chitosan and the anionic suspended sludge solids is strengthened and increased in density by the crosslinking of excess free amino groups on the polymeric chains of adjacent chitosan molecules. This crosslinking can draw the chitosan chains together, thus entraining the sludge solids and reducing the floc free space available to trap water.

Thus, in a preferred embodiment of the present invention, digested sewage sludge comprising at least about 90%, and preferably about 95–98.5% water is sequentially mixed with about 1–3% by weight of the sludge solids of chitosan, with about 0.075–0.25% by weight of the sludge solids of glutaraldehyde and with sufficient acid, preferably acetic acid, to adjust the pH of the mixture to about 5.5–6.5. The resultant floc is then separated from the liquid phase of the sludge by conventional dewatering techniques, including vacuum filtration, centrifuation, belt pressing, screw pressing, filter pressing and the like.

The invention will be further described by reference to the following detailed examples.

EXAMPLE I

OPTIMIZATION OF SLUDGE FLOCCULATION WITH CHITOSAN

A. Preparation of Chitosan Stock Solution

A stock solution of 1% chitosan was prepared by adding 10.0 grams of dried shellfish chitosan and 10.0 ml. glacial acetic acid to 800 ml of water. The mixture was heated to 50° C. and the resultant solution cooled to 25° C. and diluted to one liter by the addition of water.

B. Determination of Optimum Chitosan Dosage (i) Chitosan Flocculation

Several solutions incorporating different concentrations of chitosan were prepared by blending different volumes of the 1.0% chitosan stock solution with water so that the total volume of each solution is 40.0 ml. Portions of digested liquid sludge (200 grams) were added to five 600 ml beakers and one of the 40.0 ml chitosan test solutions was added to each beaker. The contents were stirred for 120 seconds at 500 rpm by means of a 6-bladed, 5.1 cm diameter, propellor type stirrer.

(ii) Determination of Capillary Suction Time

The capillary suction time for each portion of flocculated sludge was determined by the method fully set forth by R. C. Baskerville et al., in The Journal of the Institute of Water Pollution, 2, 3 (1968), the disclosure of which is incorporated by reference herein. Briefly, a stainless steel collar (2.5 cm high, 1.80 cm bore) is centered on a square of thick filter paper. Flocculated liquid sludge is poured into the collar. Under the influence of the capillary suction of the paper, the liquid phase of the sludge is drawn out of the sludge to progressively saturate a greater area of the filter paper, causing the liquid front to advance outwardly from the center of the paper. The time required for the front to cover the distance between two circles of diameters 3.2 and 4.5 cm concentric with the reservoir provides the capillary suction time (CST), and is quantitatively related to the physical characteristics of the sludge. The lower the CST, the more readily the treated sludge will release water upon centrifugation or filtration.

For any given sludge type, the CST is plotted against the total volume of the 1% chitosan stock solution in the blended test solution used in Ex. IB. This plot yields a descending asymptotic limit, indicating the total chitosan concentration necessary to minimize the CST. Table I, below, summarizes the concentrations of chitosan required to minimize the CST for three different types of sewage sludge.

TABLE I

| Chitosan-Treated Sludges | | |
|---|---|---|
| Total Solids in Sludge | Source | Chitosan Requirement Based on Dry Solids of Sludge |
| 2.4% | South Bend, IN (digested) | 1.04% |
| 3.2% | Elkhart, IN (non-digested) | 1.56% |
| 4.5% | Chicago, IL (digested) | 2.20% |

The concentrations of chitosan summarized on Table I were employed to flocculate the sewage samples as described in the following examples.

EXAMPLE II

EVALUATION OF SEWAGE FLOCCUATED WITH CHITOSAN

Digested liquid sewage sludge (4.5% total solids, Chicago, IL) was placed in a 600 ml beaker and treated with 40 ml of 0.5% shellfish chitosan by the procedure of Example IB. The pH of the final mixture was adjusted to 6.0 with acetic acid. The strength of the resultant floc was evaluated by determining the CST of the treated sludge by stirring the flocculated sample for 100 seconds at 500 rpm and measuring the CST as described in Example IB. The same sample was stirred at 500 rpm for an additional 100 seconds and the CST was measured after a total stirring time of 200 seconds. The procedure was repeated after total stirring of 300 and 400 seconds. The results of this evaluation are summarized on Table II, below.

TABLE II

| Floc Strength Determination (CST) | |
|---|---|
| Shear Stressing Time at 500 RPM | CST (Seconds) |
| 100 seconds | 10.4 seconds |
| 200 seconds | 12.3 seconds |
| 300 seconds | 13.1 seconds |
| 400 seconds | 16.6 seconds |

The sedimentation rate of the flocculated sludge was determined by stirring the flocculated sample for 100 seconds at 500 rpm. A 25 ml portion of the stirred sludge was poured into a 30 ml graduated centrifuge tube and held in an open face metal centrifuge tube holder for a Dynac II laboratory centrifuge. The time in seconds was measured which was required following initiation of the centrifugation for the solid-liquid interface to reach the 12.0 ml mark in the centrifuge tube at 1000 rpm, using a strobe light to stop the action. The sample was then stirred at 500 rpm for an additional 250 seconds and the sedimentation time from 25 ml to 12 ml determined after the total stirring time of 350 seconds. The sedimentation time was also determined after a total stirring time of 600 seconds. The results of the sedimentation rate determinations are summarized on Table III below.

TABLE III

| Sedimentation Rate Determination | |
|---|---|
| Shear Stressing Time at 500 RPM | Sedimentation Time at 1000 RPM |
| 100 seconds | 40 seconds |
| 350 seconds | 90 seconds |
| 600 seconds | 179 seconds |

EXAMPLE III

COMPARATIVE EXAMPLE

The strength and sedimentation rates of floc obtained by treating the 4.5% solids digested sewage sludge (200 grams) with 25 ml of a 7.5% solids solution of a commercially-available synthetic cationic flocculating agent (American Cyanamid Co. 2540C) and 15 ml of water were determined by the procedures of Example II, above. The concentration of 2540C employed was that which yielded the optimal CST by the procedure of Example IB. The results of these evaluations are summarized in Table IV, below.

TABLE IV

| Sludge Flocculation with 2540 C. | |
|---|---|
| A. Floc Strength Determination (CST) | |
| Shear Stressing Time at 500 RPM | CST (Seconds) |
| 100 seconds | 12.3 seconds |
| 200 seconds | 13.5 seconds |
| 300 seconds | 15.9 seconds |
| 400 seconds | 26.7 seconds |
| B. Sedimentation Rate Determination | |
| Shear Stressing Time at 500 RPM | Sedimentation Time at 1000 RPM |
| 100 seconds | 73 seconds |
| 350 seconds | 126 seconds |
| 600 seconds | 162 seconds |

EXAMPLE IV

CHITOSAN-GLUTARALDEHYDE FLOCCULATION

The 4.5% solids digested sludge used in Examples II–III (200 g) was sequentially mixed with 1 ml of 1% aqueous glutaraldehyde and 40 ml of 0.5% shellfish chitosan (2.2% by weight of the total sludge solids) according to the procedure of Example IB and the pH of the final mixture adjusted to 6.0 with acetic acid. The strength and sedimentation rates of the resultant floc were determined by the procedures of Example II, above, and are summarized in Table V, below.

TABLE V

| Sludge Flocculation with Chitosan-Glutaraldehyde | |
|---|---|
| A. Floc Strength Determination (CST) | |
| Shear Stressing Time at 500 RPM | CST (Seconds) |
| 100 seconds | 9.1 seconds |
| 200 seconds | 9.9 seconds |
| 300 seconds | 12.0 seconds |
| 400 seconds | 14.0 seconds |
| B. Sedimentation Rate Determination | |
| Shear Stressing Time at 500 RPM | Sedimentation Time at 1000 RPM |
| 100 seconds | 38 seconds |
| 350 seconds | 61 seconds |
| 600 seconds | 81 seconds |

The data summarized on Tables II–IV demonstrate that, while the overall strength and sedimentation rate of the sewage treated with chitosan is somewhat better than that achieved employing the synthetic cationic polymer 2540C, the overall strength and sedimentation rates of the floc produced by the use of glutaraldehyde in combination with chitosan are substantially improved over the values attained by the use of either chitosan or 2540C as the sole flocculant. For example, the percent decrease in the CST observed for the present method over that determined for the use of chitosan alone ranged from 8.3% following 300 seconds of shear stressing to 19.5% following 200 seconds of shear stressing. The percent decrease in settling rate (sedimentation time) over that determined for the use of chitosan alone ranged from 5.0% after 100 seconds of shear stressing to 54.7% after 600 seconds of shear stressing.

Although Examples I–IV were performed employing digested and undigested sewage sludge, it is expected that the present method will yield improved results when applied to flocculate and dewater a wide variety of treated and untreated sludges including food processing waste effluents such as activated brewery and vegetable sludge, poultry composite and chiller sludge, egg breaking composite, egg washer waste, meat packing and curing sludge, shrimp composite sludge, cheese whey and the like.

The invention has been described by reference to certain preferred and specific embodiments. However, one of skill in the art will appreciate that many modifications may be made therein without departing from the spirit and scope of the present invention.

What is claimed is:

1. A method for dewatering aqueous sludge comprising mixing the sludge with an amount of chitosan effective to flocculate the sludge solids and an amount of an organic dialdehyde effective to substantially strengthen the solid floc and increase the settling rate of the floc.

2. The method of claim 1 wherein said organic dialdehyde comprises glutaraldehyde.

3. The method of claim 2 wherein the pH of the sludge is adjusted to about 5-7 after addition of the chitosan and the glutaldehyde.

4. The method of claim 2 wherein the glutaraldehyde is added to the aqueous sludge prior to the addition of the chitosan.

5. The method of claim 1 wherein the sludge comprises at least about 80% water.

6. The method of claim 5 wherein an amount of chitosan equal to about 0.5-5% of the weight of the sludge solids is added to the aqueous sludge.

7. the method of claim 5 wherein an amount of glutaraldehyde equal to about 0.05-0.5% of the weight of the sludge solids is added to the aqueous sludge.

8. The method of claim 1 further comprising separating the floc from the liquid phase of the sludge by centrifugation or by vacuum filtration.

9. A method for dewatering digested or undigested aqueous sewage sludge which incorporates at least about 90% water, comprising:
 (a) flocculating the sludge with about 1-3% by weight of the sludge solids of chitosan and about 0.075-0.25% by weight of the sludge solids of glutaraldehyde; and
 (b) separating the solid floc from the liquid phase of the sewage.

10. The method of claim 9 wherein the pH of the sludge is adjusted to about 5.5-6.5 during the flocculation step.

11. The method of claim 10 wherein the pH of the sludge is adjusted by the addition of aqueous acid.

12. The method of claim 9 wherein the glutaraldehyde is mixed with the sludge prior to the addition of the chitosan.

* * * * *